(12) United States Patent
Noya

(10) Patent No.: US 6,502,169 B1
(45) Date of Patent: Dec. 31, 2002

(54) SYSTEM AND METHOD FOR DETECTION OF DISK STORAGE BLOCKS CONTAINING UNIQUE VALUES

(75) Inventor: Eric S. Noya, Groton, MA (US)

(73) Assignee: Adaptec, Inc., Milpitas, CA (US)

(*) Notice: Subject to any disclaimer, the term of this patent is extended or adjusted under 35 U.S.C. 154(b) by 103 days.

(21) Appl. No.: 09/604,348

(22) Filed: Jun. 27, 2000

(51) Int. Cl.[7] ............................ G06F 13/28; G06F 12/12
(52) U.S. Cl. .................... 711/138; 711/113; 711/114; 710/308
(58) Field of Search ................................ 711/138, 113

(56) References Cited

U.S. PATENT DOCUMENTS

| | | | | |
|---|---|---|---|---|
| 5,613,153 A | * | 3/1997 | Arimilli et al. | 711/118 |
| 5,900,014 A | * | 5/1999 | Bennett | 711/138 |
| 6,092,168 A | * | 7/2000 | Voigt | 711/170 |
| 6,351,780 B1 | * | 2/2002 | Ecclesine | 710/68 |

FOREIGN PATENT DOCUMENTS

| | | | | |
|---|---|---|---|---|
| JP | 08314803 A | * | 11/1996 | G06F/12/08 |
| WO | WO 00/65453 | * | 4/2000 | G06F/12/08 |

OTHER PUBLICATIONS

Chi–Hung Chi et al. "Improved Cache Performance by Selective Cache Bypass" System Sciences, 1989. vol. I: Architecture Track, Proceedings of the Twenty–Second Annual Hawaii International Conference on , 1989.*

Teresa Johnson et al. "Run–Time Cache Bypassing" IEEE Transactions on COmputers, vol. 48 No. 12, Dec. 1999.*

Hughes et al. "DMA Driven Processor Cache", US PGPUB 2001/0011330A1, Pub Date: Aug. 2, 2001, Filing Date: May 8, 1998.*

* cited by examiner

Primary Examiner—Hong Chong Kim
Assistant Examiner—Paul Baker
(74) Attorney, Agent, or Firm—Cesari and McKenna, LLP

(57) ABSTRACT

A system and method for detecting block(s) of data transferred to a disk array from a host processor system, in which the block(s) have unique, identifiable values or patterns, is provided. A direct memory access (DMA) engine is resident on the bus structure between the host and the disk array, which can be configured as a redundant array of independent disks (RAID). A cache memory is also resident on the bus and is adapted to cache write data from the host under control of a cache manager prior to storage thereof in the disk array. The DMA engine is adapted to detect predetermined patterns of data as such data is transferred over the bus therethrough. Such data can include a series of consecutive zeroes or another repetitive pattern. Based upon predetermined criteria, the DMA instructs the cache manager that an identified repetitive pattern is being transferred, and the cache manager takes appropriate action to optimize the transaction in view of the specific repetitive nature of the block or blocks of data being detected.

8 Claims, 3 Drawing Sheets

SYSTEM AND METHOD FOR DETECTION OF DISK STORAGE BLOCKS CONTAINING UNIQUE VALUES

FIELD OF INVENTION

The invention relates generally to the field of computer systems and more particularly to systems that employ disk storage based upon a redundant array of independent disks (RAID) implementation.

BACKGROUND OF THE INVENTION

A computer system includes an operating system whose primary function is the management of hardware and software resources in the computer system. The operating system handles input/output (I/O) requests from software processes or applications to exchange data with on-line external storage devices in a storage subsystem. The operating system (such as Windows NT® available from Microsoft, Corp. of Redmond, Wash.) forwards I/O requests to an I/O subsystem, which, in turn, converts the logical addresses into physical locations in the storage devices and commands the latter devices to engage in the requested storage or retrieval operations.

The on-line storage devices on a computer are configured from one or more disks into logical units of storage space referred to herein as "containers." Examples of containers include volume sets, stripe sets, mirror sets, and various Redundant Array of Independent Disk (RAID) implementations. A volume set comprises one or more physical partitions, i.e., collections of blocks of contiguous space on disks, and is composed of space on one or more disks. Data is stored in a volume set by filling all of the volume's partitions in one disk drive before using volume partitions in another disk drive. A stripe set is a series of partitions on multiple disks, one partition per disk, that is combined into a single logical volume. Data stored in a stripe set is evenly distributed among the disk drives in the stripe set. In its basic configuration, a stripe set is also known as a "RAID 0" configuration. A mirror set is composed of volumes on multiple disks, whereby a volume on one disk is a duplicate copy of an equal sized volume on another disk in order to provide data redundancy. A basic configuration for a mirror set is known as "RAID 1." There is often a desire to increase data reliability in a stripe set by using parity distributed across storage blocks with respect to each stripe. Where such parity is provided to the stripe set, the configuration is known as "RAID 5." In an even more complex implementation, where stripe sets are mirrored on a plurality of containers—and redundant data is distributed across the stripes, the resulting configuration is known as "RAID 10." Generally speaking, all configurations of the RAID implementation (RAID 0–10) provide a collection of partitions, where each partition is composed of space from one disk in order to support data redundancy.

According to a prior system, the I/O subsystem configures the containers through a software entity called a "container manager." Essentially the container manager sets up a mapping structure to efficiently map logical addresses received from the operating system to physical addresses on storage devices. The I/O subsystem also includes a software is driver for each type of container configuration on the system. These drivers use the mapping structure to derive the physical addresses, which they then pass to the prospective storage devices for storage and retrieval operations.

Speed of data transfer and storage is an important aspect of RAID storage arrangement. Enhancing speed, where possible is highly desirable. In certain implementations, common patters of storage are found, such as where a preconfigured RAID is provided with all logical "zero" values. In fact, many applications write only one value across a large number of unique-pattern storage blocks (often all logical "zeros"). Where the central processing unit (CPU) is involved in the write to disk storage, caching of data and other processes result in significant uses of processor resources and overhead. This tends to delay other processor and bus activities.

Accordingly, it is an object of this invention to provide a more direct and efficient system and method for detecting blocks of unique values (zeroes, ones and a known combination) and writing such blocks to disk storage with minimum, or no processor intervention/overhead.

SUMMARY OF THE INVENTION

This invention overcomes the disadvantages of the prior art by providing a system and method that enables blocks of data having specific patterns or values to be handled differently by a memory storage system/adapter than other blocks, thereby increasing overall efficiency when these specific types of data blocks with unique data patterns are encountered. In a preferred embodiment, a direct memory access (DMA) engine is resident on a bus structure between a host processor system and the disk array, which can be configured as a redundant array of independent disks (RAID). A cache memory is also resident on the bus and is adapted to cache write data from the host under control of a cache manager prior to storage thereof in the disk array. The DMA engine is adapted to detect predetermined patterns of data as such data is transferred over the bus there through. Such data can include a series of consecutive zeroes or another repetitive pattern. Based upon predetermined criteria, the DMA instructs the cache manager that an identified repetitive pattern is being transferred, and the cache manager takes appropriate action to optimize the transaction in view of the specific repetitive nature of the block or blocks of data being detected.

The DMA engine can comprise a state-machine having counter and other combinatorial logic functions. It contemporaneously reads the bus on-the-fly as data passes therethrough. In one example, the detected blocks have a predetermined data pattern composed of all zeroes. The DMA engine notifies the cache manager of the existence of such a block, and the cache manager causes the block to bypass the cache memory in favor of a SCSI-based copying of zeroes to the disk free of further processor of host-to-cache bus (PCI bus) intervention. Detection of zeroes or another repetitive pattern can be based upon a counting by the DMA of a predetermined number of zeroes in a transmitted block. If that stated number of zeroes is detected, then the block is identified as a zero-only block and appropriate optimization procedures are implemented.

BRIEF DESCRIPTION OF THE DRAWINGS

The foregoing and other objects and advantages of the invention should become clearer with reference to the following detailed description, as illustrated by the drawings, in which.

DETAILED DESCRIPTION OF AN ILLUSTRATIVE EMBODIMENT

Figure 1:
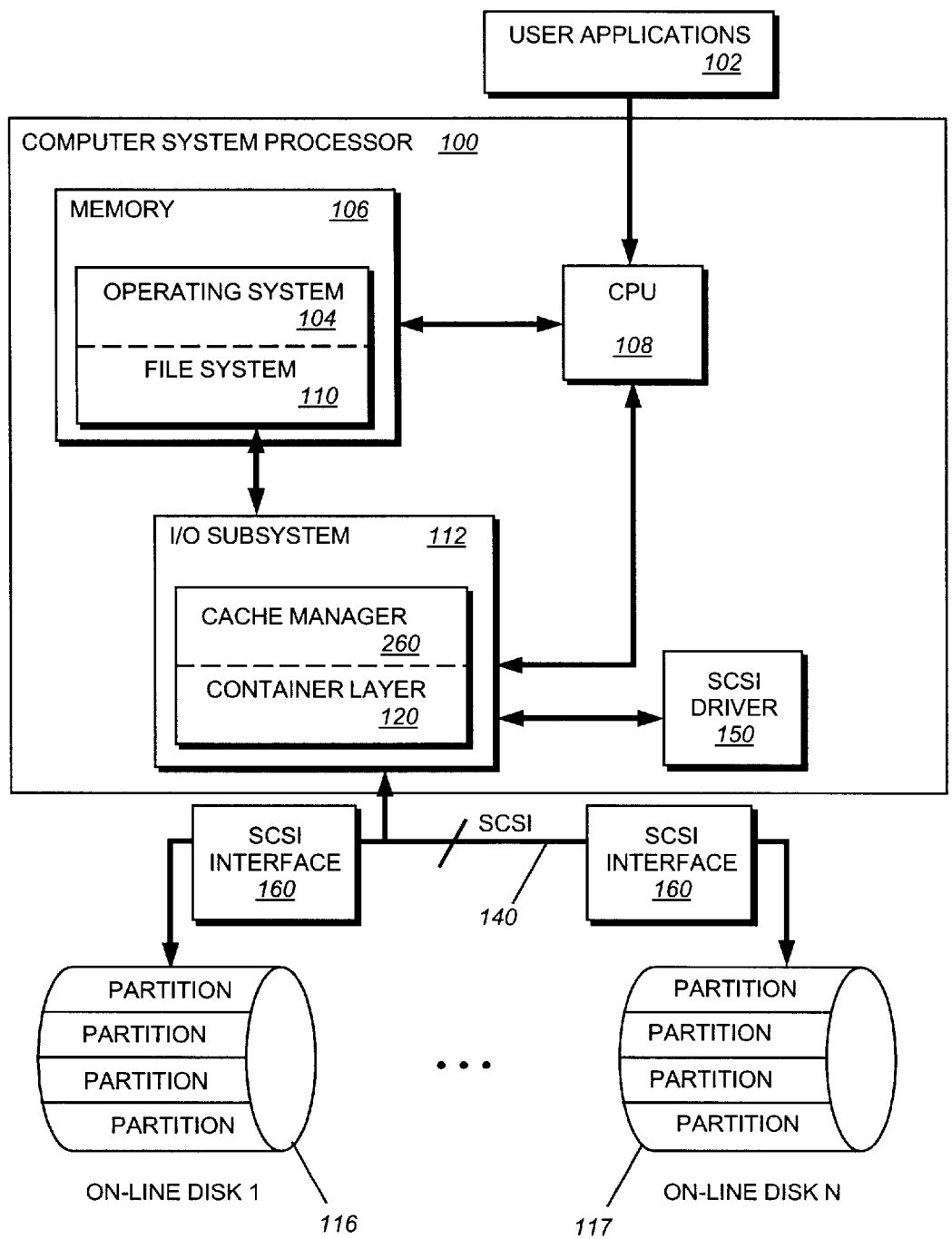
FIG. 1 is a block diagram of a typical RAID storage implementation showing a partitioned set of disks according to the principles of this invention.

FIG. 1 is a schematic block diagram of a typical computer system that is as a RAID 5 storage configuration in accordance with the present invention. The computer system processor 100 comprises a memory 106 and an input/output (I/O) subsystem 112 interconnected with a central processing unit (CPU) 108. The memory 106 comprises storage locations addressable by the CPU 108 and I/O subsystem 112 for storing software programs and data structures. An operating system 104, portions of which are typically resident in the memory 106 and executed by the CPU 108, functionally organizes the computer processor 100 by, inter alia, handling I/O operations invoked by software processes or application programs executing on the computer. The I/O subsystem 112 is, in turn, connected to a set of on-line storage devices 116. These on-line storage devices 116 are partitioned into units of physical space associated with the inventive copy-on-write procedure described herein. The storage devices (disk drives) are typically interconnected via a small computer system interface (SCSI) bus 140 having a driver circuitry shown as generalized block 150. This circuitry may be distributed throughout the system in both hardware and software. Each disk drive is connected to the bus via appropriate SCSI interface circuitry 160 known generally to the art.

User applications 102 and other internal processes in the computer system invoke I/O requests from the operating system 104 by file names. A file system 110, which is a component of the operating system 104, translates the file names into logical addresses. The file system 110 forwards the I/O requests to a I/O subsystem 112 which, in turn, converts the logical addresses into physical locations in the storage devices 116 and commands the latter devices to engage in the requested storage or retrieval operations. The I/O subsystem 112 configures the partitions of the physical storage devices 116, 117 into containers and stores container configuration tables in the container layer 120 of the I/O subsystem 112. Container configuration enables the system administrator to partition a disk drive into one or more virtual disks. In addition, a cache manager 260 and corresponding cache memory operates in association with the I/O subsystem 112 as is described further below.

Figure 2:
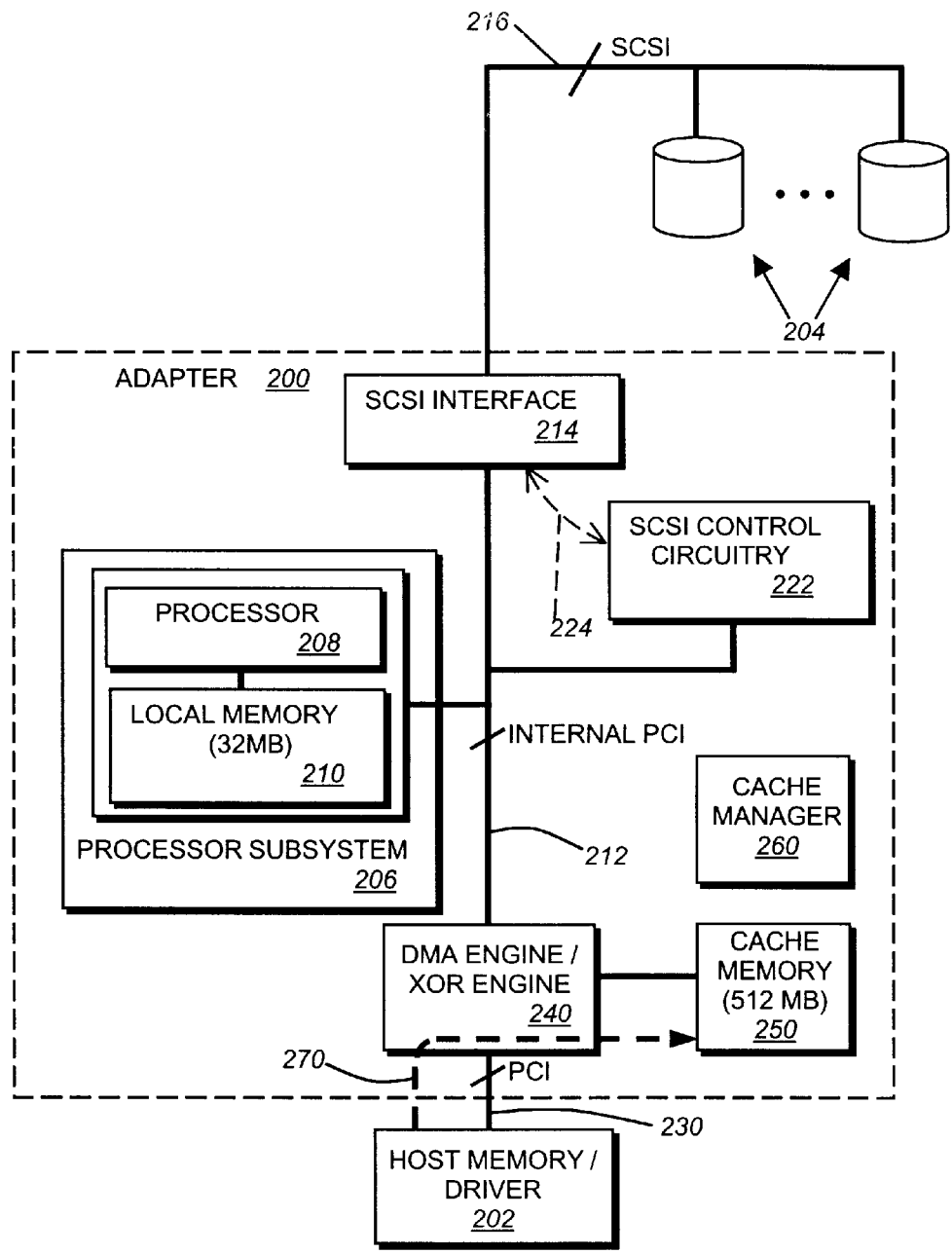
FIG. 2 is a more detailed block diagram showing an adapter for detecting and storing unique blocks according to a preferred embodiment of this invention.

With further reference to FIG. 2, a modified adapter 200 is provided to handle memory storage between the host memory and its associated driver 202 and the RAID disk storage array 204. A processor subsystem 206 is provided including an on-board processor 208 and a local memory 210. The local memory in this embodiment is a 32-megabyte array. However the size and configuration of this memory is highly variable. The processor subsystem is interconnected along an internal peripheral component interconnect (PCI) bus 212. The internal PCI bus 212 is, itself, terminated in a small computer system interface (SCSI) bus interface 214 that supports an SCSI bus 216 extending to the RAID storage array 204. As described above, the disks of the array are arranged in a group of containers according to a desired storage configuration (RAID 5 for example).

The SCSI functions and parameters are controlled by a set of SCSI control circuits/chips 222, generally resident on the PCI bus (a 64-bit PCI in this embodiment) and also in direct connection (dashed line 224) with the SCSI interface 214.

The host memory/driver 202 is interconnected with the adapter via an external PCI bus 230. The connection is specifically made through a direct memory access (DMA) engine 240 according to this invention. The DMA engine 240 is an application specific integrated circuit (ASIC) having an architecture that is adapted to carry out the unique detection function according to this invention.

The DMA engine is also interconnected to an on-board cache memory 250. The cache memory is adapted to store blocks passing between the host and the disk array, and has a size of 512 megabytes in this embodiment. The size and configuration of this memory is, again, variable depending upon system requirements and application. Typically, it is a non-volatile, battery-backed-up storage device designed to ensure that data is reliably maintained before and during transfer to the disk array. I/O operations are essentially complete from a processor perspective when data is cached, since the manager can, at a remote future time (if necessary), perform the final transfer to the disk array independently. Direct disk access functions are, therefore governed by the cache manager 260 according to this embodiment. In general, when data is written by the host to appropriate addresses in the disk array 204 the cache manager to intervenes and initially places the write data into the cache 250 for subsequent transfer down the SCSI bus 216 via the SCSI interface 214.

Generally, the DMA engine enables direct, high-speed caching of data from the host to the cache (dashed line 270) and on to the disk array without direct host processor intervention under the control of the cache manager. When a write to the disk from the host of a data block is instructed, the block is initially transmitted down the bus arrangement, and stored in the cache memory 250. Again, this occurs by action of the DMA engine 240 free of CPU intervention. The DMA then transfers the blocks from the cache to the disk assembly, also free of intervention. The cache manager particularly facilitates addressing and storage of blocks in the cache. Blocks are typically 4K–8K byte in this embodiment.

This invention particularly relates to the detection of operations involving large blocks of unique or repetitive data patterns. Blocks containing all logical zeros are one example. Such blocks are often written over an entire storage space during preconfiguration of a RAID disk arrangement. In general, the detection techniques used herein are desirable in handling such large blocks so as to minimize bus and processor overhead.

Figure 3:
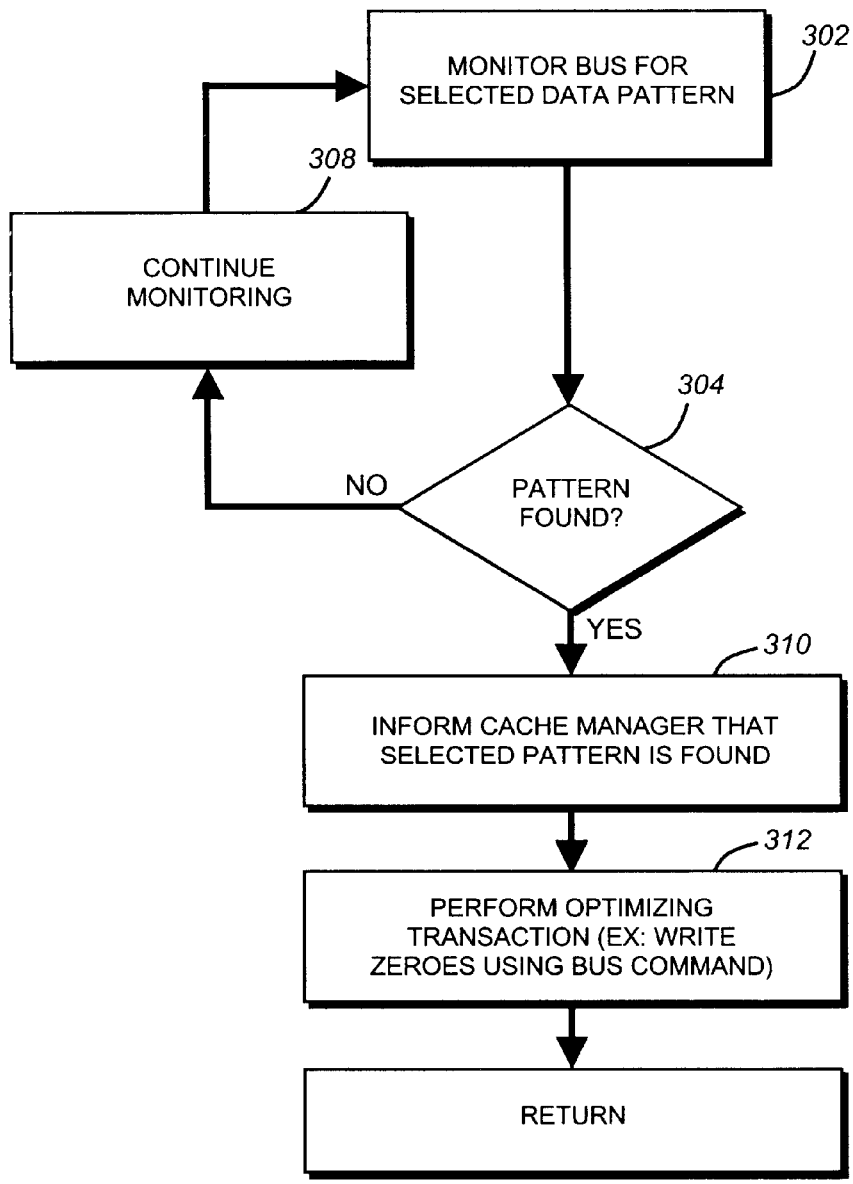
FIG. 3 is a flow diagram of a generalized block detection procedure according to this invention.

The DMA according to a preferred embodiment is modified to include logic for detecting specific types of data blocks contemporaneous with the transfer of these blocks over the bus 230. Referring also to FIG. 3, the DMA specifically monitors the bus "wires" for the current the data state (step 302). The DMA includes state-machine logic that is configured to detect a predetermined data condition or pattern. The detection logic is preferably built/burnt-into the DMA circuitry, or can dynamically programmable according to an alternate embodiment to enable the system to detect certain customized data patterns. The detection conditions under which the DMA operates can be triggered based upon a variety of conditions. By way of example, each time a transfer of zeroes occurs through the DMA engine, it monitors the state. The smallest readable data chunk is generally a block of 512 bytes. Each time a block having the selected repetitive pattern throughout (e.g. all zeroes or all ones), passes through the DMA engine, the DMA engine sends a status indicator noting that the specified block is all zeroes. The engine can be adapted to count bits/bytes so as to detect the size of a 512-byte block, and check that each counted byte in the block has the selected repetitive (zero) pattern.

Using the indication from the DMA engine, the cache manager maps each identified block as an all-zero block in an overall 4K or 8K-byte cache memory entry. In particular, a bitmap is is created by the cache manager that registers which 512-byte block(s) of cache memory entries have the selected repetitive pattern (e.g. all zero entries).

In each example, the bus 230 is read on-the-fly and a determination is made (decision step 304), as the data is in the process of transfer along the bus. Bus monitoring by the DMA occurs continuously (step 308) until a pattern is found. Note that, as used herein, the term "predetermined data pattern" shall be taken to include streams of data (typically a block) transmitted over the bus to the DMA engine having a selected characteristic that is typically repetitive/similar throughout the stream.

When a desired data pattern is detected, the DMA messages the cache manager/memory that a predetermined pattern has been detected (step 310). The cache manager is now informed that the current block being transferred is a common pattern block (example—all zeroes) and can take appropriate action to optimize the transaction (step 312). In general, the cache manager can place a note that the block is all zeroes in the cache memory, and then perform a time-saving/optimization function that bypasses standard bus procedure such as refraining from physically transmitting the data of the repetitive-pattern block down the bus to the host in favor of a disk-based or bus-based write of the block. In this instance, the cache manager informs the bus-level circuitry to perform a write of the particular block using, for example an inherent SCSI command. The bitmap in the cache indicates the relative position of the repetitive block in the write data, allowing so that the repetitive block is omitted from the stream, and, instead, only its size and location in the memory is transmitted to a bus-based write command. The command then writes the block into the disk at the appropriate location without transmission of block data down the bus from the cache.

A related system and method for providing a time/overhead-saving technique for storing large repetitive blocks (for example—all zeroes) is taught in commonly assigned U.S. patent application Ser. No. 09/604,347 filed on Jun. 27, 2000, entitled System and Method for Zeroing Storage Blocks in a RAID Storage Implementation by John F. Considine et al, the teachings of which are expressly incorporated herein by reference. This technique, therefore, bypasses standard processor-based write operations by executing a bus-controller-level SCSI-based copy command to place repeated zeroes into the disk space without processor intervention. In this manner zeroing of a block or blocks occurs quickly and without unduly occupying the cache memory or by occupying the processor with an involved zero-write operation across the disk space. It is expressly contemplated that other procedures that enable disk storage to occur with minimal cache or bus overhead are also possible using the detection procedures herein.

The foregoing has been a detailed description of a preferred embodiment of the invention. Various modifications and additions can be made without departing form the spirit and scope of the invention. For example, the DMA engine can be implemented in a variety of configurations of hardware and firmware. The components falling within the adapter can be varied and components can be variously incorporated into one or more circuit chips or chip sets. Accordingly, this description is meant to be taken only by way of example, and not to otherwise limit the scope of this invention.

What is claimed is:

1. A system for detecting blocks of data having a predetermined data pattern for storage in a disk array, the disk array being interconnected by a bus to a cache memory, and the cache memory being interconnected to a host processor, the system comprising:

a cache memory for receiving the blocks of data from the host prior to storage thereof in the array;

a cache manager for controlling receipt of the blocks in the cache memory and transfer of the blocks to the disk array;

a direct memory access (DMA) engine that transfers the blocks of data from the host to the cache memory, constructed and arranged to detect whether any of the blocks of data include a predetermined data pattern; and means for instructing the cache manager, based upon the detection of the predetermined data pattern, to perform an optimization transaction that bypasses storage of selected data of the blocks of data from the host in the cache memory and that causes storage of the data in the disk array free of initial storage in the cache memory.

2. The system as set forth in claim 1 wherein the predetermined data pattern comprises at least one identified block of the blocks of data having all logical zero values therein.

3. The system as set forth in claim 2 wherein the cache manager is constructed and arranged to provide information to the cache memory indicating the detection of the predetermined data pattern associated with the identified block.

4. The system as set forth in claim 3 wherein the DMA engine is constructed and arranged to count a predetermined number of data in the identified block in which to detect the predetermined data pattern therein.

5. A method for detecting blocks of data having a predetermined data pattern for storage in a disk array, the disk array being interconnected by a bus to a cache memory, and the cache memory being interconnected to a host processor, the method comprising the steps of:

receiving, in a cache memory, the blocks of data from the host prior to storage thereof in the array;

controlling, with a cache manager, receipt of the blocks in the cache memory and transfer of the blocks to the disk array;

transferring, with a direct memory access (DMA) engine, the blocks of data from the host to the cache memory, and detecting, with the DMA engine, whether any of the blocks of data include a predetermined data pattern; and instructing the cache manager, based upon the detection of the predetermined data pattern, to perform an optimization transaction that bypasses storage of selected data of the blocks of data from the host in the cache memory and that causes storage of the data in the disk array free of initial storage in the cache memory.

6. The method as set forth in claim 5 wherein the step of detecting includes detecting at least one identified block of the blocks of data having all logical zero values therein.

7. The method as set forth in claim 6 further comprising providing, by the cache manager, information to the cache memory indicating the detection of the predetermined data pattern associated with the identified block.

8. The method as set forth in claim 7 wherein the step of detecting includes counting, with the DMA engine, a predetermined number of data in the identified block in which to detect the predetermined data pattern therein.

* * * * *